July 8, 1969     L. MANCEBO     3,454,814
TUBULAR VAPOR SOURCE
Filed July 29, 1966
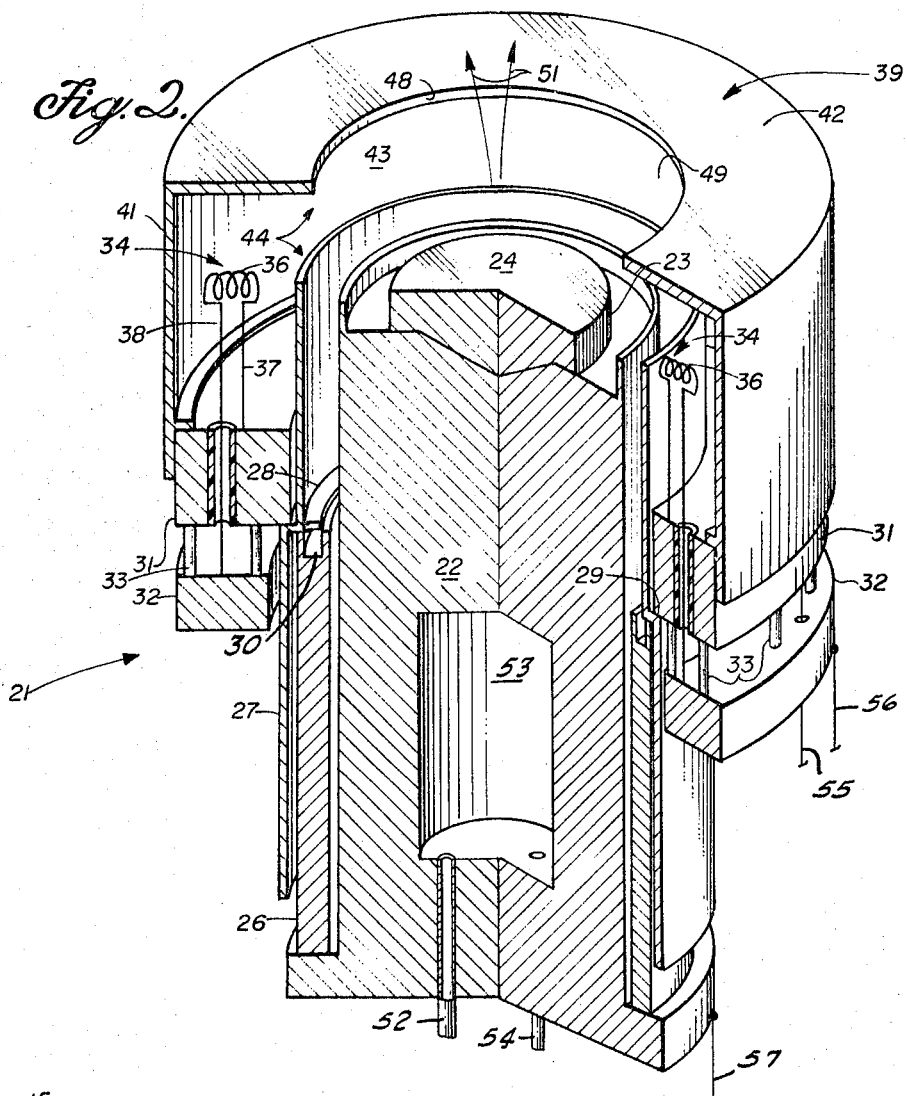
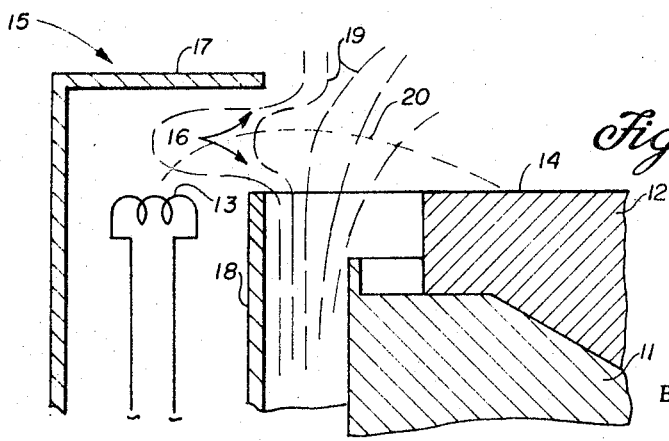
INVENTOR.
LLOYD MANCEBO
BY Roland A. Anderson
ATTORNEY

United States Patent Office 3,454,814
Patented July 8, 1969

3,454,814
TUBULAR VAPOR SOURCE
Lloyd Mancebo, Livermore, Calif., assignor to the United States of America as represented by the United States Atomic Energy Commission
Filed July 29, 1966, Ser. No. 568,983
Int. Cl. H01j 1/42, 13/18, 1/52
U.S. Cl. 313—305                                  8 Claims

ABSTRACT OF THE DISCLOSURE

A compact vapor source including a central anodic rod whose end is supplied with a substance to be vaporized in a forward direction, a cathode disposed about the anode laterally planar thereto, and electrostatic means for guiding electrons from the adjacent cathode position onto the face of the substance to be vaporized. Power is supplied to said electrodes from a generally rearward direction, thereby permitting use of said source in small apertures, such as the base of a cathode ray tube envelope for plating the face thereof.

---

The present invention relates to electron-bombardment vaporization devices used in vapor deposition processes, and more particularly, to compact, electron-bombardment vapor source devices which are bakeable at high temperatures and which operate from a power supply with non-critical voltage regulation requirements.

Electron beam vapor sources are a suitable means of vaporizing and depositing films of a wide range of materials, for example, metals, minerals and even certain organic materials in applications such as thin film deposition, vacuum tube coating, plating of mirror surfaces, etc. Generally, such devices provide vaporization energy at the surface of a material to be vaporized and deposited by impinging electrons directly on the material to be evaporated. Such a technique is superior to many other methods of evaporant source heating in that the highest temperature region is the evaporant emitting surface and not, for example, the main body of evaporant or the evaporant support material. Such devices generally comprise an electron source, an evaporant source material to be vaporized and a means of directing the electrons to impinge on the surface of the evaporant source material. The devices are generally disposable within a vacuum chamber to prevent oxidation of the electron source or evaporant surface, and to prevent interference with emission of the vaporized evaporant source material. The source material is further disposed such that evaporant emanating therefrom can be directed to impinge upon a surface to be coated.

A common type of electron-bombardment evaporation device in the prior art is commonly defined as having a "self-accelerated electron beam" in which the accelerating voltage is supplied in a separate system and the beam is focused on the work which is at a distance. An example of such a device comprises an evaporant source disposed upon a water-cooled surface and further centrally disposed between two elongated members of magnetized material such that the surface of the evaporant material is perpendicular to the elongated surfaces of the magnetic members. One or two electron emitters, e.g., electrically resistant filaments or solid cathodes, are disposed in spaced relation to the evaporant source and also centrally disposed between the magnetic members. On activation of the electron emitters, electrons are ejected therefrom and the magnetization strength and disposition of the magnetic members are selected such that the magnetic field produced thereby directs the electrons onto the evaporant source surface to evaporate particles of source material therefrom. In addition to the normal problems of, for example, maintaining purity and uniform distribution of evaporant, two particular problems are encountered with such devices. First, the magnetic members must be of magnetic materials, for example, ferritic metals. The surfaces of these members must be cleaned with great care, as is necessary for all surfaces of such devices to maintain purity. The simplest procedure is to "bake out" the device while simultaneously evacuating the vacuum chamber containing the device. However, ferritic metals cannot be heated above their Curie temperature, i.e., above about 250° C., without destroying or impairing their magnetic characteristics. Therefore, with such devices, it may be necessary to completely disassemble the device before such critical cleaning can be accomplished. Secondly, system geometry and the voltage level supplied to the electron emitter are each critical in controlling the flow of electrons from the electron emitter to the evaporant. The efficiency is dependent upon the proportion of electrons exiting the electron emitter which actually impinge on the surface of the evaporant material. A high efficiency is desirable in that electrons which do not arrive at the evaporant material surface represent wasted energy and may, in addition, impose further cooling requirements on the device. Although such "self-accelerated electron beam" devices may be particularly advantageous in certain applications, a second type of device is also employed which is sometimes defined as a "work-accelerated electron beam" device in which the accelerating voltage to direct the electron flow exists between the emitting cathode and the material being bombarded. An example of such a device, which relies on electrostatic forces rather than electromagnetic forces to direct the electron flow, may comprise an electron source in the form of a "Pierce" lens. In such a source, the electrons are emitted from a concave surface to "focus" at the focal point of the concave surface. This concave electron source is disposed in spaced relation to the evaporant source material such that the focal point is located on the surface of the vaporant source surface. By application of an electrostatic potential between the electron source and the evaporant surface, the flow of electrons toward the evaporant surface is further promoted. Such a device permits easier cleaning of the device since it does not include magnetic materials which might be damaged by high temperatures suitable for bakeout. Further, the use of electrostatic fields of force rather than magnetic fields reduces the voltage regulation critically on the electrical supply to the electron source. However, system geometry still remains somewhat critical since the concave electron source must still be "focused" upon the evaporant, both as to alignment and distance. Also, the line-of-sight communication between the electron emitter and evaporant may permit evaporant "poisoning" of the emitter. In addition, the components of this device, like those of the "self-accelerated electron beam" type, permit only a limited reduction of overall size and, thus, either type of device may present considerable problems in applications where compactness is critical.

The present invention provides an electron-bombardment vapor source device which is compact, withstands high "bake-out" temperatures without degradation or necessity of disassembly, permits use of a non-critical power supply, and which further is of simple, compact and economical construction and permits easy assembly and disassembly.

Accordingly, it is an object of the present invention to provide an electron-bombardment heated vapor source device which is not degraded by high "bake-out" temperatures, and which permits use of a non-critical voltage regulation power supply. It is another object to provide an electron-bombardment heated vapor source which may have miniaturized dimensions for applications where space is critical. It is a further object to provide a vapor source device of simple and economical construction. It is a still further object to provide an electron-bombardment heated vapor source device having relatively non-critical geometrical alignment to permit rapid and simple assembly and disassembly.

The present invention is defined below with reference to FIGURES 1 and 2, where:

FIGURE 1 is an illustration of the spatial relationship of the eelctron emitter cathode shield and evaporant source material of the present invention; and FIGURE 2 is an illustration of a preferred embodiment of the present electron-bombardment vapor source device.

In brief, the vapor source device of the present invention comprises a suitable support for holding an evaporant source material, an electron emitter disposed in spaced, substantially offset, i.e., non-line-of-sight, relation with the surface of the evaporant source material from which evaporant particles are to be ejected, and a conductive shield disposed in conductive relation to the electron source such that they are of substantially equal electrical potential. The shield forms electrostatic lines of force which direct electrons emanating from the electron source along an offset, i.e., non-line-of-sight, beam path toward the vaporant source surface.

More particularly, referring to FIGURE 1, anode 11 of an electrically conductive member of material, such as copper, having a receptacle portion for receiving an appropriate body of an evaporant source material 12 of, for example, a disk of aluminum, copper, gold, nickel or any other material suitable for evaporation coating, e.g., plastic, organic coatings, and ceramic materials. For example, anode 11 may have a dished upper receptacle surface to receive evaporant source 12 and prevent it from shifting. Further, anode 11 may be adapted for water cooling to prevent undesirable thermal buildup on continued operation to cause a deleterious reaction at the interface of anode 11 and evaporant source 12, e.g., by water cooling means as described hereinafter. An electron emitter 13 is disposed in offset relation to evaporant emissive surface 14, i.e., to one side adjacent anode 11 with its emitter surface approximately on a plane with the upper evaporant emissive surface 14 of evaporant source 12. Emitter 13 is, for example, an electrically heated electron emissive element, e.g., a tungsten of other refractory resistance metal filament, oxide coated cathode, etc. A channeled cathode shield 15 is disposed with respect to and defines a chamber effectively enclosing electron emitter 13, extending somewhat above emitter 13. Shield 15 defines an apparatus 16 generally opening laterally between annular end cover 17 and a side 18 of shield 15 nearest anode 11 from said upper shield chamber portion above emitter 13 toward evaporant source 12, but offset in relation to a straight line between emitter 13 and evaporant surface 14, i.e., at a level higher than emissive surface 14 of evaporant source 12. With this arrangement, side 18 of cathode shield 15 is completely interposed across the line-of-sight path between emitter 13 and evaporant source 12 in spaced, electrically insulated relation with anode 11. Cathode shield 15 is composed of an electrically conductive material such as nickel or stainless steel, and is maintained in electrical connection with emitter 13. Electrical terminals (not shown) may be employed to establish an electrical potential between emitter 13 (with connected cathode shield 15) and anode 11. An additional power source may be employed to heat emitter 13 and cause electron emission as in conventional practice.

The electrostatic characteristics of emitter 13 and cathode shield 15 define electrostatic equipotential lines 19 which are relatively concentrated between anode 11 and shield 15. Said equipotential lines 19 diverge in the general region between aperture 16 and evaporant surface 14. Electrostatic lines of force, not shown but of which electron path 20 is one approximation, are perpendicular to a segment of each equipotential line 19. Thus, since a mobile electron tends to follow the electrostatic lines of force, electron path 20 is generally perpendicular to the equipotential lines 19 and curves between emitter 13 and evaporant surface 14.

At a few milliamperes down to microampere levels are adequate to vaporize a wide range of materials. Higher and lower voltages may also be used. In operation, an electrostatic potential, for example 5–10 thousand volts, AC or DC, is applied between anode 11 (with conductively associated cathode shield 15), for example, by a battery, transformer or DC power supply, such that evaporant source 12 is at a positive potential with respect to emitter 13 and cathode shield. The electrostatic potential between evaporant source 12 and the combination of emitter 13 and cathode shield 15 creates an electrostatic field with diverging equipotential lines 19 in the region generally between aperture 16 and source 12. Electrons traveling from emitter 13 to evaporant emission surface 14 follow, for example, path 20 which conforms with lines of force normal to a segment of each equipotential line 19. The heater power supply causes resistive heating of emitter 13 with a resulting emission of electrons. The electrons, traveling generally normal to the electrostatic equipotential lines 19, as discussed above, are directed onto emissive surface 14 of evaporant source 12. More specifically, the electrons are emitted upwardly into the upper chamber portion of shield 15 to progress laterally through aperture 16 and then curve downwardly to impinge on surface 14. The material of surface 14 thenceforth is heated and vaporized to flow upwardly along a path generally offset and parallel to the original electron emission.

The relative geometry of electron emitter 13, cathode shield 15 and evaporant source 12 is predetermined to control the locus of electron path 20. The proper configurations of these elements may be readily determined by first using electrostatic field plot techniques to obtain an approximation and then more precisely by using an electron model by techniques well known in the art.

However, for simple configurations such as shown in FIGURE 1 or the specific embodiment illustrated in FIGURE 2, it has been found that accurate "focusing" may be achieved by simple trial and error, e.g., by varying the configuration of shield 15 or the general accelerating voltage range until the electron beam is observed to impinge upon the center of evaporant source surface 14. Exemplary dimensions are illustrated by the specific embodiment discussed infra. It has further been found that the electrostatic potential applied between anode 11 and emitter 13-cathode shield 15 assembly may be varied considerably and, although the electron beam path will be altered, electron impingement will not be varied beyond the locus of evaporant source surface 14. Thus, it is possible to employ a readily available AC power source to maintain the electrostatic field.

It is to be noted that the assembly of the present invention permits very compact dimensions. For example, the maximum cross-sectional dimension of such an assembly may be maintained at less than one inch for applications where spatial dimensions are critical.

Further, the electron emitter 13 may be maintained in a non-line-of-sight or offset communication with the evaporant emission surface such that evaporated particles do not impinge on and poison the emitter filament. The voltage regulation on the electrostatic field may be varied widely and even AC power may be employed. The apparatus is susceptible to high bake-out temperatures, for example of 400–500° C., so that an improved vacuum environment may be achieved. Since the apparatus geometry is not highly critical, the components may be designed for rapid and simple assembly and disassembly.

An embodiment 21 of the present invention, giving specific exemplary dimensions and parameters, is described with reference to FIGURE 2. Electron beam vapor source device 21 comprises a cylindrical water-cooled anode 22 having a centrally dished upper receptacle surface to receive a disk of evaporant source material 23, for example, of aluminum. Water cooling of anode 22 may be provided by circulating water from an inlet conduit 52 through the bottom of anode 22 through a chamber 53 formed therein to be discharged from a conduit 54 leading away from the bottom of anode 22. In an exemplary practical device, anode 22 has a diameter of approximately one inch and evaporant disk 23 a diameter of approximately 7/16 inch. The upper emissive surface 24 of evaporant disk 23 may be substantially higher than any portion of anode 22, since the source is maintained in the solid state with vaporization occurring only on the areas of electron impingement. Insulating cylinder 26, e.g., of ceramic, is supported by a flanged lower portion of anode 22, closely about the lower outer surface of anode 22, with the upper end of cylinder 22 well below the upper receptacle surface of anode 22. A conductive cylinder 27 of stainless steel has an inside diameter of approximately 15/16 inches, which is fitted at the upper end in spaced relation to the upper portion of anode 22 in closely spaced concentric relation about insulating cylinder 26 and supported by means of an inside flange 28 which rests on insulating cylinder 26. The inside diameter of flange 28 is substantially greater than the outer diameter of anode 22 to provide ample spacing to prevent short circuiting thereacross, e.g., by globules of liquid evaporant.

Further, the top surface of insulating cylinder 26 has an annular recess 30 to provide trapping capacity for liquid evaporant. The inside diameter of flange 28 is sufficiently large to leave recess 30 open. Thus, globules of liquid evaporant emitted from evaporant 23 may flow into said recess and be prevented from shortcircuiting between conductive cylinder 27 and anode 22 by the interrupted path hereby provided.

An outer shoulder 29, on cylinder 27, about on the same level as inner flange 28, supports a first conductive ring 31, e.g., of copper, concentrically about the upper portion of shield 27. A second conductive ring 32, e.g., of stainless steel is suspended in spaced concentric relation to first ring 31 by ceramic insulator spacers 33. Electron emitters 34, e.g., tungsten filaments, are centrally disposed in the annular projection space above first ring 31 with the electron emissive filament 36 thereof just below the approximate plane of evaporant emissive surrface 24, and of the upper end of cylinder 27. A first leg 37 of electron emitter 34 is conductively attached to first ring 31. The second leg 38 of emitter 34 insulatedly penetrates first ring 31 and is conductively connected to second ring 32. Said electron emitters, first and second conductive rings and ceramic spacers may comprise a structural emitter assembly. Electron emissive filaments 36 are disposed approximately 11/16 inch from the center of evaporant emissive surface 24 in the exemplary embodiment. Outer conductive cathode member 39, e.g., of stainless steel, comprises an outer cylindrical wall 41 with an inside flange disposed to rest on conductor ring 31 and an annular cover end disk 42 having its outer diameter joined to the upper terminus of cylinder 41. For example, outer cylinder wall 41 may have an inside diameter of approximately 1 7/8 inches with the other specific dimensions given above. Thus, the upper extremity of cylinder 27, outer conductive cathode member 39 and ring 31 define an annular cathode chamber 43, the walls of which are all in substantially equipotential conductive relation. The cover end 42 of member 39 and the upper end of cylinder 27 define an annular inner port 44 through which the upper portions of chamber 43 are generally laterally directed toward the upper surface of evaporant 23. Electron emitters 36 are substantially centrally located within the lower portions of chamber 43, below line-of-sight communication with evaporant 23. The inner marginal edge 48 of cover disk 42 defines a circular port 49 through which material 51 vaporized from evaporant 24 may emerge axially and be directed for use as described hereinafter. The port 49 is generally smaller than the diameter of cylinder 27, but larger than the diameter of evaporant disk 24. Electrical terminal leads 55, 56 and 57 are connected to ring 31, ring 32 and anode 22, respectively, and extend rearwardly away from the device 21 such that a first electrical source (not shown) may be connected to provide accelerating potential across ring 31 and anode 22 and a second electrical source (not shown) may be connected across ring 31 and ring 32 to energize filaments 36.

In operation, electron beam heated evaporation device 21 is disposed in a vacuum environment under conventional, i.e., high vacuum or other appropriate deposition conditions with emissive surface 24 in line-of-sight communication through port 49 with a surface (not shown) to be vapor-coated, e.g., with aluminum. A first electrical source applies AC power of approximately 5–10 kv. and 60 cycles between ring 31 and anode 22. An equivalent DC source can also be used. Thus, ring 31, cylinder 27 and electrode shield 39 define an inner surrface at equipotential with respect to evaporant 23. Electrostatic equipotential lines are thereby created having a segment normal to a predetermined electron path from emitter surface 36 to evaporant surface 24. A second electrical source applies an AC voltage of, for example, 5 volts across ring 31 and ring 32 to heat filament 36 and cause electron emission. Electrons travel upwardly in chamber 43, are deflected radially inward through port 44 and deflected downwardly thereafter to be directed onto approximately the center of evaporant surface 24, thereby causing emission of atomic, molecular or particulate evaporants, e.g., of aluminum. The AC nature of electrical power imposed between ring 31 and anode 22 causes variation in the impingement locus of electrons, but the locus of impingement is substantially limited to an area defines by the outer perimeter of evaporant source surface 24. For some purposes, this variation of locus is beneficial, since pinpoint burnout, etc. is obviated.

Although the present invention has been discussed with particular reference to two particular embodiments, it is obvious that many variations are possible within the scope of the present invention. Accordingly, the scope of the present invention is to be limited only by the appended claims.

What is claimed is:

1. A compact tubular vapor source for use in generating vapor from a body of evaporant source material in an evacuated environment, comprising in combination:
   (a) an elongated generally cylindrical anode including a receptacle portion at a first end to provide for disposition of said evaporant source material body thereon;
   (b) a cathode shield including inner and outer concentric equipotential conductive wall members defining an annular cathode chamber disposed in spaced coaxial relation to the first end of said anode, said inner wall extending in spaced insulated relation at least partially coextensive with the first end of said anode to project thereabove to at least approximately the upper surface of said evaporant body when disposed in said receptacle portion and with said outer wall extending beyond said inner wall member to support a generally annular end portion extending radially inward and defining with the upper end of said inner wall member an annular port communicating said annular chamber with the space above the receptacle end of said anode;
   (c) at least one electron emitter cathode means disposed in said cathode chamber generally in a plane through said body of evaporant when disposed in said anode receptacle portion and below a line-of-sight path therebetween over the upper end of said inner cathode shield wall member;

(d) first terminal lead means for applying energizing current to said electron emitter means and arranged to maintain said emitter means at a substantially equipotential level with reference to said cathode shield and with said terminal lead means extending rearwardly of the second end of said anode; and (e) second terminal lead means for applying an electrical potential between said cathode shield and said anode productive of an electric field effective to extract electrons emitted from said electron emissive means into said chamber and direct said electrons along a curved path through said annular shield aperture to impinge on the upper receptacle portion of said anode and thereby generate vapor of said body when disposed therein, said terminal leads extending rearwardly of the second end of said anode.

2. The apparatus of claim 1, wherein said electron emitter means is a filament exhibiting high electrical resistance and said anode is provided with water cooling means.

3. The apparatus of claim 2, wherein an electrically insulative cylinder is interdisposed between said inner cathode shield wall member and said anode.

4. The apparatus of claim 3, wherein the cathode shield and electron emitter means are of predetermined geometry and disposition to provide electrostatic equipotential lines concentrated between said anode and said cathode shield and diverging in the region between said cathode shield aperture and said evaporant emission surface, thereby causing at least one electrostatic line of force originating at said electron emitter means and terminating upon said evaporant body along a path which is substantially normal to a segment of each equipotential line.

5. The apparatus of claim 4, wherein said cathode shield includes a first electrically conductive ring member joining said inner and outer wall members thereby defining the lower boundary of said annular chamber and wherein said cathode shield is in electrical communication with one leg of said electron emitter filament and with one of said first electrical terminal means.

6. The apparatus of claim 5 wherein the upper end of said insulative cylinder terminates below the level of said first receptacle end of the anode, wherein said inner shield wall member includes a flanged portion resting upon the outer periphery of said insulative cylinder and wherein the outer wall of said inner cylinder includes a flanged portion supporting said first ring member, wherein a second conductive ring member is disposed in fixed insulated relation below said first conductive ring member, wherein one leg of said emitter filament is connected to said first conductive ring member, wherein the second leg of said filament passes in insulated relation through said first ring member to be connected to the second ring member, wherein said first terminal lead means are connected to said first and second ring members to apply energizing current to said filament, and wherein one of said second terminal lead means is interconnected with the first terminal lead means connected with the first ring member and a second is connected to said anode, respectively.

7. The apparatus of claim 6, wherein said insulative cylinder includes an annular recess on its top surface, providing an interrupted path between said cathode shield and said anode, thereby substantially preventing globules of liquid evaporant from causing a short circuit therebetween.

8. The apparatus of claim 7, wherein said anode and said second conductive ring are copper, said inner conductive cylinder, said first conductive ring and said outer cathode shield are stainless steel and said insulative cylinder is ceramic.

References Cited

UNITED STATES PATENTS

| | | | |
|---|---|---|---|
| 2,942,098 | 6/1960 | Smith | 219—121 |
| 2,994,801 | 8/1961 | Hanks | 219—121 X |
| 3,132,198 | 5/1964 | Du Bois et al. | 219—121 X |
| 3,333,136 | 7/1967 | Coleman et al. | 219—121 X |

OTHER REFERENCES

Varian Associates "e-Gun," July 1963, p. 9.

JAMES W. LAWRENCE, *Primary Examiner.*

RAYMOND F. HOSSFELD, *Assistant Examiner.*

U.S. Cl. X.R.

13—9; 219—121; 313—17, 313